Patented Apr. 12, 1949

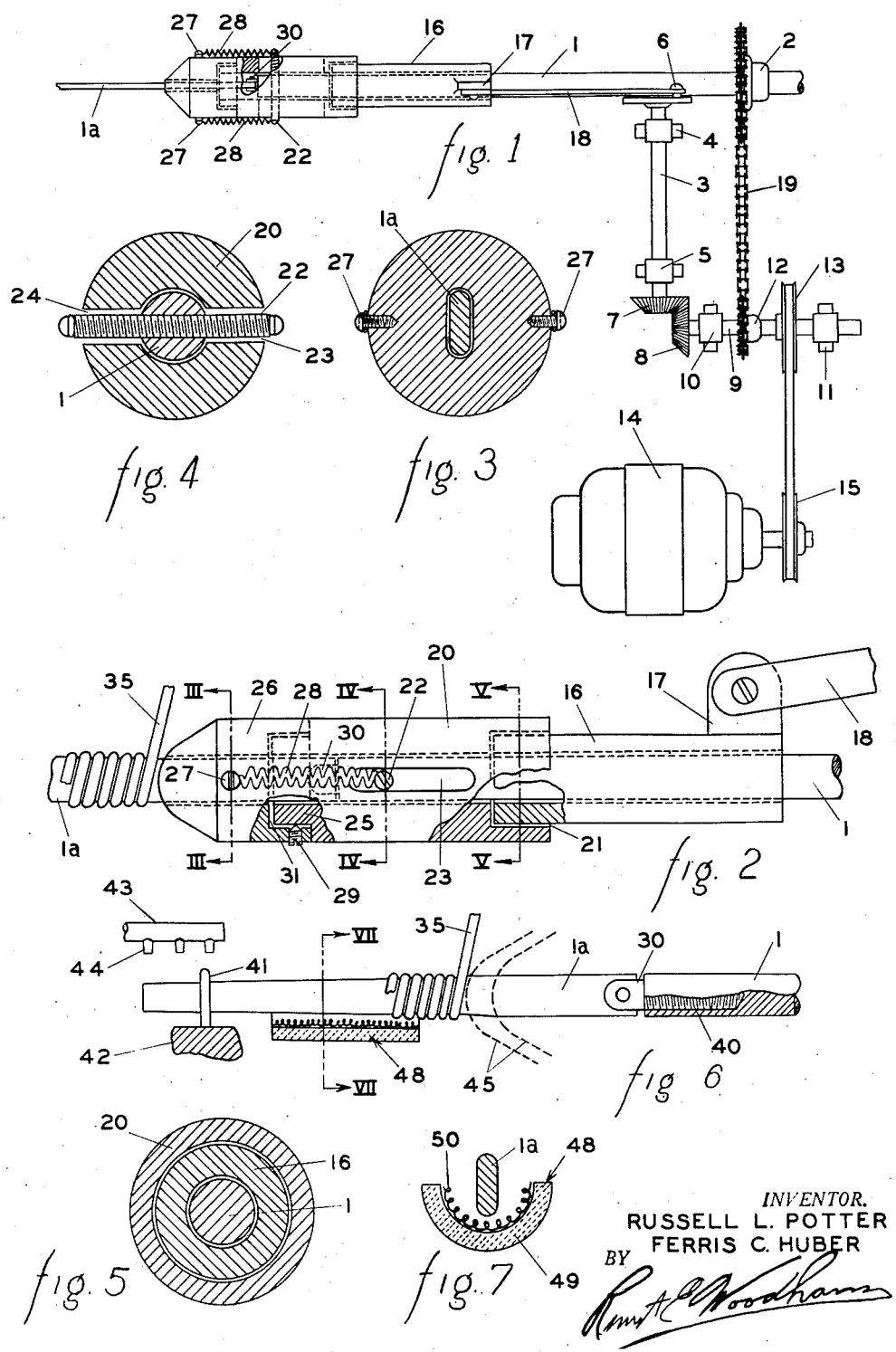

2,467,227

UNITED STATES PATENT OFFICE 2,467,227

MEANS FOR FORMING FLAT HELICOIDAL STRUCTURES

Russell L. Potter and Ferris C. Huber, Detroit, Mich.

Application June 7, 1946, Serial No. 675,276

11 Claims. (Cl. 18—19)

This invention relates to a machine for forming a helicoidal structure from plastics materials, and particularly for forming such a structure having a greater dimension in one transverse direction than it has in another transverse direction.

In the art of forming helicoidal structures from metallic material, as wire, there has grown up a number of highly developed mechanisms. However, in the forming of helicoidal structures from plastics material it has been found that the theory upon which the wire handling mechanisms operate is largely inapplicable so that substantially different means must be provided. This has been done to some extent for forming helicoidal structures of plastics material wherein the structures have a circular cross-section, but such devices do not work even with considerable modification where the structure to be formed has a substantially greater dimension in one transverse direction than it has in another transverse direction.

Thus there is presented a problem requiring special treatment and treatment which must be upon a different theory of operation than anything known prior to this time.

Accordingly, it is a major object of our invention to provide a machine for practicing said method, for forming from plastics material a helicoidal structure in which the dimension in one transverse direction is substantially greater than the dimension in another transverse direction.

A further object of our invention is to provide a machine for forming a helicoidal structure as aforesaid which will provide a continuous production of finished product.

A further object of our invention is to provide a machine for forming helicoidal structure as aforesaid from plastics material in which either thermosetting or thermoplastics material may be handled rapidly and efficiently.

Other objects and purposes of our invention will be apparent to those persons acquainted with the methods and equipment of this type upon a reading of the following disclosure and inspection of the accompanying drawings.

In the drawings:

Figure 1 represents a somewhat schematic, partially sectioned, plan view of the operating elements of my machine.

Figure 2 represents a side, partially sectioned, view of the portion of my machine in the region of the actual coil forming mechanism.

Figure 3 is a section taken on line III—III of Figure 2.

Figure 4 is a section taken on the line IV—IV of Figure 2.

Figure 5 is a section taken on the line V—V of Figure 2.

Figure 6 is a detail of the mandrel portion of our device as used with thermoplastic material showing particularly the means for heating and cooling the coiled plastic.

Figure 7 is a section taken on the line VII—VII of Figure 6.

In providing a method and mechanism for meeting the objects and purposes above outlined, we have in general provided means by which a mandrel of appropriate cross-sectional shape is rotated and while rotating receives a strip of flexible plastics material, while properly timed with said rotations a pushing head reciprocates on the mandrel pushing the coils therealong as they are formed. It is best that this pushing occurs as the strip being wound onto the mandrel is coming onto it on narrow side of the mandrel. Since, for a substantially rectangular mandrel, this occurs twice with each rotation thereof, the structure being formed is preferably pushed twice with each rotation of the mandrel. The material when thermoplastic is then heated and subsequently cooled to fix in coiled position. In the drawings the device by which our invention may be practiced is shown somewhat schematically inasmuch as the particular manner and form of holding the various parts in operative position form no part of the invention and can be supplied by any person acquainted with equipment of this type.

Referring now to the drawings there is shown a suitably mounted rotatable main shaft 1 supporting for rotation with it a sprocket 2. Adjacent said shaft is a crank driving shaft 3 suitably supported on bearings 4 and 5, provided at its one end with a crank 6 and at its other end with a bevel gear 7. Meshed with said bevel gear 7 is a second bevel gear 8 mounted on a driving shaft 9 which is in turn rotatably supported by suitable bearings 10 and 11. Also mounted on said driving shaft 9 is a sprocket 12 having one-half the diameter of the sprocket 2, and a pulley 13. A suitable motor 14 of any convenient type fitted with a driving pulley 15 is operatively connected by a suitable belt with said pulley 13.

Mounted slidably onto the main shaft 1 is a driving sleeve 16 within which said shaft is permitted to rotate and which is provided at one end with a lug 17. Pivotally affixed to said lug is one end of a connecting bar 18 whose other end is pivotally affixed to the crank 6, whereby rotation of the shaft upon which said crank is mounted will cause reciprocation of the driving sleeve 16 with respect to the shaft 1. Also mounted slidably onto the main shaft 1 and adjacent the forward (leftward as appearing in the drawings) end of the driving sleeve 16 is a driven sleeve 20. Said driven sleeve has a recess 21 in one end which receives one end of the driving sleeve 16 thereinto in partially telescoping and rotatable relationship therewith. A spring holding anchor pin 22 extends through a suitable opening in the main shaft 1 and extends a substantially equal distance therefrom on each side of said shaft. Said pin may be threaded, or may in any other suitable manner be held in a fixed relationship to said shaft 1. The pin extends through the sides of the driven sleeve 20 through a pair of slots 23 and 24 suitably arranged in the opposite sides of said driven sleeve.

At the forward end of said driven sleeve is a portion 25 of reduced diameter for purposes appearing following.

A head sleeve 26 is provided cooperating with the extreme forward end of the driven sleeve 20, and receives in partial telescoping relationship therewith the reduced diameter portion 25 of the driven member 20 to which it is held by a set screw 29. A suitable pin 27 is affixed in each side of the said head sleeve 26 to which are affixed the springs 28, which springs are affixed at their respective other ends to each end of the anchor pin 22.

The main shaft 1 supports at its forward end the non-circular mandrel 1a for rotation on an axis coinciding with the axis extended of said shaft. The end 30 of the mandrel is attached to the shaft at a point which, as shown in Figures 1 and 2 is a short distance forward of the location of the anchor pin 22 and, further, is spaced at substantial distance from the inner face 31 of the recessed portion of the head member 26. The importance of this will appear hereinafter. While the mandrel may if desired be an integral continuation of the main shaft 1, it preferably will be detachable as hereinafter described for replacement by mandrels of different sizes and/or cross-sectional shapes.

The extreme forward end of the head sleeve 26 is tapered and is preferably formed somewhat rounding as best shown in Figure 2.

Referring now to Figure 6 there appears a detailed illustration of the mandrel and the parts associated therewith for use with a thermoplastic material. The mandrel itself is here taken as of substantially rectangular cross-section although it will be evident that other non-circular forms may be used. Any convenient threaded means 40 extending from the end of the mandrel may be provided for cooperation with a threaded opening in the end of the shaft 1, by which a given mandrel may be held onto said shaft but will be readily replaceable. The mandrel will be tapered sufficiently to permit pushing of the coiled material therealong and the amount of such taper will vary according to the characteristics of the material being handled and the particular size and shape of the mandrel. As a specific but not limiting example it has been found that for a mandrel twelve inches long, one-half inch wide and one-sixteenth of an inch thick a taper of 0.050 inch in twelve inches of length is satisfactory. A ring 41 mounted on any suitable base 42 surrounds the discharge end of the mandrel but is spaced therefrom sufficiently to permit the passage of the coiled material on said mandrel between the mandrel and said ring. The purpose of the ring is to prevent excessive sidewise flutter by the free end of the mandrel when same is in rapid rotation. A pipe 43 provided with a plurality of jets 44 is provided and supported in any convenient manner (not shown) for directing cooling fluid, such as water, in one or more streams as needed onto the coiled plastic at the end of the mandrel.

The broken lines 45 indicate the two extreme positions of the head sleeve 26 as it reciprocates on the mandrel.

Interposed between the point of application of the plastic strip to the mandrel and the cooling fluid jets 44 is a heater element 48. This may be made in any convenient manner but is here specifically shown, for illustrative purposes only, as a semi-cylindrical shell 49 of any refractory material, such as porcelain, supporting a plurality of heating coils 50 which partially surround the mandrel 1a. The said heating member is fixedly mounted so that the mandrel 1a rotates with respect thereto by which the entire plastic coil on the mandrel is uniformly heated. A suitable source of electric current (not shown) is operatively associated with said heater and a suitable source of cooling fluid (not shown) is operatively associated with the pipe 43.

*Operation*

As the motor 14 is energized and rotates it will effect rotation of the driving shaft 9, and through the bevel gears 7 and 8 it will cause rotation of the crank driving shaft 3 and circular movement of the crank 6. The bevel gears 7 and 8 being of equal size the crank 6 will make one revolution with each rotation of the driving shaft 9. Through the sprockets 2 and 12 and the connecting chain 19 the main shaft 1 will be caused to rotate, but due to the two-to-one ratio between the said sprockets the main shaft 1 will rotate only once for every two rotations of the driving shaft 9.

The circular movement of the crank pin 6 will act through the connecting bar 18 to impart reciprocating motion to the driving sleeve 16. On its forward stroke (leftward as appearing in the drawing) the said sleeve 16 will move the driven sleeve 20 in the same direction and it in turn will likewise move the head sleeve 26. When the driving sleeve 16 commences to move rearwardly (rightwardly as appearing in the drawing) the springs 28 being anchored to the anchor pin 22 will act against the fastening pins 27 to pull the head sleeve and the driven sleeve 20 backwardly to follow the driving sleeve 16 during its backwardly moving stroke.

During this operation, however, the main shaft 1 has been continuously rotating and through the anchor pin 22 acting against the walls of the slot 23 and 24 said anchor pin will cause the driven sleeve 20 and the head sleeve 26 to rotate with said shaft. As shown in Figures 2 and 5 the joint between the driving sleeve 16 and the driven sleeve 20 is both slidable and rotatable so that the driven sleeve 20 will be free to rotate with respect to the driving sleeve 16.

Since the main shaft 1 in our illustrative embodiment rotates at one half the speed of the crank driving shaft 3, it will be understood that the three sleeve members will move forwardly and backwardly twice with each rotation of the main shaft and corresponding rotation of the drive sleeve and head sleeve. It will be noted that the head sleeve 26, being internally shaped similarly to the non-circular mandrel will not pass backwardly onto the circularly cross-sectional main shaft 1. Hence the end point 30 of the mandrel must be far enough backwardly to clear said head sleeve 26 in its rearwardmost position. The circular opening within the driven sleeve 20 will, of course, pass over this part without difficulty.

With the mechanism operating as described, a strip of thermoplastic material 35, is fed onto the mandrel 1a at a suitable angle thereto to provide the proper pitch for the helix. By proper timing of the reciprocation of the sleeve members with respect to the rotational position of the mandrel 1a, it will be seen that the head sleeve 26 can be caused to move forward and contact the rearward face of the rearwardmost part of the helix and, at selected rotative positions of the main shaft 1, and push the whole helicoidal structure in a forward, or leftward direction. Since, for the machine here shown, the head sleeve 26 will come forward in this manner twice for each rotation of the mandrel 1a it will be seen that this pushing operation can be obtained during the laying of the plastic strips across each of the narrow sides of the mandrel, and this is the preferable manner of operation. However, it is possible and within the scope of our invention to permit the pushing action to occur at other points in the rotation of the mandrel, and even to occur only once for each such rotation. In fact, the amount of turning possible for the mandrel between successive pushing actions being a function of the friction between the plastic strip, and the mandrel, it is conceivable that the mandrel might in some cases make several rotations between such successive pushing actions.

The thermoplastic strip when cold is sufficiently flexible to bend closely around the mandrel. It is in such position caused to pass the heater 48 where it is warmed, and hence softened, sufficiently to assume the coiled position as its permanent shape. Immediately thereafter it passes the cooling station, here the zone under the jets 44, where the material is cooled and thus set in its new, or coiled, shape. The coil may then be discharged immediately from the end of the mandrel into a suitable receptacle, or to other convenient receiving means.

Where thermosetting material is used, it will be discharged directly onto the mandrel from an extruder, and the heater 48 and cooling means 44 will be omitted. By controlling the heat content of the plastics material so that it is very close to the setting point as it is wound around the mandrel, and occasionally additionally cooling the mandrel, it can be caused to set promptly upon being laid thereon and thus be sufficiently stiff to be pushed along the mandrel as above described without distortion.

The feeding means for the plastics strip 35 are conventional and hence are not shown.

It will be evident that the particular form of mandrel 1a shown in Figure 3 is for illustrative purposes only and it may be varied widely without departing from the scope of my invention. As here shown, variations in the form of the mandrel are limited to non-circular shapes, and having a rather substantially greater dimension in one transverse direction than in another transverse direction. However, it is entirely conceivable that appropriate modification can be made to apply the basic principles of our device to mandrels of circular cross-section with certain desirable advantages obtained in the forming of circular coils.

It will also be understood that many other details of the mechanism here illustrated and described may be widely varied according to choice or in order to meet certain particular conditions of operations, but which variations will be within the scope of my hereinafter appended claims excepting as said claims expressly provide otherwise.

We claim:

1. In means for forming a helicoidal structure having a transverse dimension in one direction greater than that in the other direction, the combination comprising: a main shaft having axially aligned and operatively associated therewith a mandrel of suitable cross-sectional contour; means for rotating said shaft and mandrel at a pre-selected rate of rotation; means slidable on said mandrel and reciprocating thereon in timed relation to the rotation of said mandrel for intermittently engaging a helicoidal structure wound on the mandrel and pushing same therealong, said slidable means being rotatable with said shaft and mandrel.

2. In means for forming a helicoidal structure the combination comprising: a rotatable shaft having a mandrel associated therewith as an axial extension thereof and rotatable with said shaft; reciprocable sliding means on and rotatable with said mandrel; means for rotating said shaft and means for reciprocating said sliding means, said two last-named means being so timed with respect to each other that the sleeve makes a selected number of complete reciprocating cycles with each rotation of said shaft.

3. In means for forming a helicoidal structure having a plurality of side portions of substantially greater radius than other side portions, the combination comprising: a rotatable shaft having a mandrel associated therewith as an axial extension thereof and rotatable with said shaft; reciprocable pushing means mounted slidably on and rotatable with said mandrel; means for rotating said shaft and means for effecting reciprocation of said pushing means; said last two named means being so timed with respect to each other that with each rotation of the shaft and mandrel the pushing means makes a number of reciprocations equal to the number of first above named side portions.

4. In means for forming a helicoidal structure having a transverse dimension in one direction greater than that in the other direction, the combination comprising: a rotatable shaft having a mandrel associated therewith as an axial extension thereof and rotatable with said shaft; a longitudinally slidable driving sleeve on said shaft and longitudinally slidable driven sleeve on said shaft; said driven sleeve being rotatable with respect to said driving sleeve; means for providing an elongated opening through at least one side of said driven sleeve and a pin affixed in said shaft extending radially outwardly through said elongated opening; a head sleeve non-rotatably mounted on but slidable with respect to the mandrel and partially telescopically receiving an adjacent end of said driven sleeve; resilient means connected between said pin and said head sleeve for urging said head sleeve toward said pin; means for rotatably supporting said shaft and causing same to rotate at a pre-selected rate; means for reciprocating said driving sleeve at a pre-selected rate timed with respect to the rotation of said sleeve.

5. In means for forming a helicoidal structure having a plurality of side portions of substantially greater radius than other side portions, the combination comprising: a rotatable mandrel shaft having a mandrel associated therewith as an axial extension thereof and rotatable with said shaft; reciprocable pushing means mounted slidably on and rotatable with said mandrel; means for rotating said mandrel and means for effecting reciprocation of said pushing means; said last two named means being so timed with respect to each other that with each rotation of the mandrel the pushing means makes a number of reciprocations equal to the number of first above named side portions.

6. In means for forming a helicoidal structure having a transverse dimension in one direction greater than that in the other direction, the combination comprising: a main shaft having axially aligned and operatively associated therewith a mandrel of selected cross-sectional contour; means for rotating said shaft and mandrel at a pre-selected rate of rotation; means slidable on and rotatable with said mandrel and reciprocating thereon in timed relation to the rotation of said mandrel for intermittently engaging a helicoidal structure wound on the mandrel and for pushing same therealong; means for heating said helicoidal structure and means for cooling said structure after the heating all while said structure is being urged along said mandrel, but without contact between the urging means and the heated portion of the coil.

7. In means for forming a helicoidal structure having a transverse dimension in one direction greater than that in the other direction, the combination comprising: a main shaft having axially aligned and operatively associated therewith a mandrel of suitable cross-sectional contour; means for rotating said shaft and mandrel at a pre-selected rate of rotation; means slidable on and rotatable with said mandrel and reciprocating thereon in timed relation to the rotation of said mandrel for intermittently engaging a helicoidal structure wound on the mandrel, said means engaging said structure along the greater dimension thereof and pushing same therealong.

8. In means for forming a helicoidal structure having a transverse dimension in one direction greater than that in the other direction, the combination comprising: a main shaft having axially aligned and operatively associated therewith a mandrel of suitable cross-sectional contour; means for rotating said shaft and mandrel at a pre-selected rate of rotation and for winding a plastic strip on said mandrel; pushing means slidable on and rotatable with said mandrel for intermittently engaging the helicoidal structure wound on the mandrel along the greater dimension of said structure and means for reciprocating said pushing means in such timed relation to the rotation of said mandrel that said plastic strip is pushed therealong each time it is being laid onto the narrow side of said mandrel.

9. In means for forming a helicoidal structure having a transverse dimension in one direction greater than that in the other direction, the combination comprising: a main shaft having axially aligned and operatively associated therewith a mandrel of suitable cross-sectional contour; means for rotating said shaft and mandrel at a pre-selected rate of rotation and for winding a plastic strip on said mandrel; means slidable on and rotatable with said mandrel, and reriprocating thereon in timed relation to the rotation of said mandrel for intermittently engaging a helicoidal structure wound on the mandrel along the greater dimension of said structure and for pushing same therealong each time the plastic strip is being laid on to the narrow side of said mandrel; means for heating said helicoidal structure and means for cooling said structure after the heating all while said structure is being urged along said mandrel.

10. In means for forming a helicoidal structure having a transverse dimension in one direction greater than that in the other direction, the combination comprising: a main shaft having axially aligned and operatively associated therewith a mandrel of suitable cross-sectional contour; means for rotating said shaft and mandrel at a pre-selected rate of rotation; means slidable on said mandrel and reciprocating thereon in timed relation to the rotation of said mandrel for intermittently engaging a helicoidal structure wound on the mandrel and for pushing same therealong; means for heating said helicoidal structure and means for cooling said structure after the heating, without contact between the urging means and the heated portion of the coil.

11. In means for forming a helicoidal structure from a plastic material the combination: of a rotatable mandrel and means rotating same, said mandrel receiving at an angle to its axis a strip of said plastics material for forming said structure; means rotatable with said mandrel, and slidable thereon and with respect thereto, for pushing the structure on said mandrel along said mandrel intermittently in timed relation to the rotation of said mandrel.

RUSSELL L. POTTER.
FERRIS C. HUBER.

REFERENCES CITED

The following references are of record in the file of this patent:

UNITED STATES PATENTS

| Number | Name | Date |
|---|---|---|
| 861,608 | Richardson | July 30, 1907 |
| 1,393,041 | Robertson et al. | Oct. 11, 1921 |
| 2,363,826 | Yellin | Nov. 28, 1944 |
| 2,388,401 | Freundlich | Nov. 6, 1945 |
| 2,393,058 | Pierce et al. | Jan. 15, 1946 |